(12) United States Patent
Nakayama

(10) Patent No.: US 9,798,356 B2
(45) Date of Patent: Oct. 24, 2017

(54) BAND AND ELECTRONIC EQUIPMENT

(71) Applicant: CASIO COMPUTER CO., LTD., Shibuya-ku, Tokyo (JP)

(72) Inventor: Kenji Nakayama, Iruma (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/063,300

(22) Filed: Mar. 7, 2016

(65) Prior Publication Data
US 2016/0278203 A1 Sep. 22, 2016

(30) Foreign Application Priority Data

Mar. 16, 2015 (JP) .................. 2015-051562

(51) Int. Cl.
*G06F 1/16* (2006.01)
*A44C 5/14* (2006.01)
*H01M 2/02* (2006.01)

(52) U.S. Cl.
CPC ............... *G06F 1/163* (2013.01); *A44C 5/14* (2013.01); *H01M 2/0202* (2013.01); *H01M 2/0207* (2013.01); *H01M 2/0275* (2013.01); *H01M 2002/0205* (2013.01); *H01M 2220/30* (2013.01)

(58) Field of Classification Search
CPC ....................................................... G06F 1/163
See application file for complete search history.

(56) References Cited

U.S. PATENT DOCUMENTS

| | | | | |
|---|---|---|---|---|
| 5,615,179 A * | 3/1997 | Yamamoto | ........... | G04G 17/083 224/168 |
| 5,695,885 A * | 12/1997 | Malhi | ..................... | H01M 2/10 429/123 |
| 5,889,737 A * | 3/1999 | Alameh | ................. | G04C 10/00 368/204 |
| 9,367,087 B1 * | 6/2016 | Townsend | ............... | G06F 1/163 |
| 2003/0030595 A1 * | 2/2003 | Radley-Smith | ....... | A44C 5/0007 345/1.3 |
| 2007/0064542 A1 * | 3/2007 | Fukushima | ........ | G04B 37/1486 368/282 |
| 2012/0122519 A1 * | 5/2012 | Jochheim | ............... | H04B 1/385 455/556.1 |
| 2013/0106603 A1 * | 5/2013 | Weast | ..................... | G06F 1/163 340/539.11 |
| 2015/0049591 A1 * | 2/2015 | Adams | ................... | G04G 21/08 368/13 |
| 2015/0206044 A1 | 7/2015 | Nitta | | |
| 2015/0212541 A1 * | 7/2015 | Lu | .......................... | G04G 17/02 361/679.03 |

(Continued)

FOREIGN PATENT DOCUMENTS

JP 2000298181 A 10/2000
JP 2002151032 A 5/2002

(Continued)

*Primary Examiner* — Anthony Q Edwards
(74) *Attorney, Agent, or Firm* — Holtz, Holtz & Volek PC

(57) ABSTRACT

A band, including: a device which has a part to be protected; and a protective frame which has a soft section that is easily deformed and a hard section that is less easily deformed than the soft section, the hard section being connected to the soft section and disposed at a portion where the part to be protected is disposed.

7 Claims, 10 Drawing Sheets

(56) References Cited

U.S. PATENT DOCUMENTS

| | | | |
|---|---|---|---|
| 2015/0333302 A1* | 11/2015 | Johns | H01M 2/1066 |
| | | | 429/127 |
| 2015/0346766 A1* | 12/2015 | Justice | G06F 1/163 |
| | | | 361/679.03 |
| 2015/0378391 A1* | 12/2015 | Huitema | G06F 1/163 |
| | | | 361/679.03 |
| 2016/0058133 A1* | 3/2016 | Fournier | H04B 1/3888 |
| | | | 455/41.2 |
| 2016/0094259 A1* | 3/2016 | Hatanaka | H04B 1/385 |
| | | | 455/90.2 |
| 2016/0139564 A1* | 5/2016 | Tsushima | G04R 60/04 |
| | | | 368/282 |
| 2017/0005504 A1* | 1/2017 | Rho | H02J 7/025 |

FOREIGN PATENT DOCUMENTS

| | | |
|---|---|---|
| JP | 2008107440 A | 5/2008 |
| JP | 2014021644 A | 2/2014 |

\* cited by examiner

BAND AND ELECTRONIC EQUIPMENT

CROSS-REFERENCE TO RELATED APPLICATIONS

The entire disclosure of Japanese Patent Application No. 2015-051562 filed on Mar. 16, 2015 including description, claims, drawings, and abstract are incorporated herein by reference in its entirety.

BACKGROUND OF THE INVENTION

1. Field of the Invention

The present invention relates to a band and an electronic equipment.

2. Description of Related Art

Conventionally, in equipments such as wristwatches capable of separating main bodies from bands, devices have been provided to the main bodies which are not bent or deformed, the devices having portions vulnerable to deformation such as portions being broken due to applied external forces.

In addition, even in an equipment which has a body and a band integrally formed as described in Japanese Patent Application Laid-Open Publication No. 2014-21644, for example, a device having a part vulnerable to deformation is disposed on a portion having a shape and a specification which make the portion difficult to bend, and it has been impossible to dispose the device on a portion which is capable of bending deformation.

However, a body of an equipment such as a wristwatch is compact and the space to contain the device is limited.

Thus, it has been difficult to load a large-capacity battery, and there has been a need to increase the size of equipment body in a case of loading such battery.

Even in a case where the equipment has the configuration as in the Japanese Patent Application Laid-Open Publication No. 2014-21644, the design of equipment is limited when devices corresponding to various needs are to be loaded.

Though the band may be used as a space for containing various devices, in a case of loading, into the band, a device having a part vulnerable to deformation, there are problems such as bad wear comfort and poor design since the band needs to have a configuration avoiding the bending deformation.

SUMMARY OF THE INVENTION

In order to solve the above problems, according to one aspect of the present invention, there is provided a band, including: a device which has a part to be protected; and a protective frame which has a soft section that is easily deformed and a hard section that is less easily deformed than the soft section, the hard section being connected to the soft section and disposed at a portion where the part to be protected is disposed.

According to another aspect of the present invention, there is provided an electronic equipment, including: a band; and an equipment body which is connected to the band, wherein the band includes: a device which has a part to be protected; and a protective frame which has a soft section that is easily deformed and a hard section that is less easily deformed than the soft section, the hard section being connected to the soft section and disposed at a portion where the part to be protected is disposed.

BRIEF DESCRIPTION OF THE DRAWINGS

The above and other objects, advantages and features of the present invention will become more fully understood from the detailed description given hereinafter and the appended drawings which are given by way of illustration only, and thus are not intended as a definition of the limits of the present invention, and wherein.

DETAILED DESCRIPTION OF THE PREFERRED EMBODIMENT

Hereinafter, an example of an embodiment of a band and an electronic equipment including the band according to the present invention will be described in detail with reference to the accompanying drawings. However, the scope of the invention is not limited to the illustrated examples.

Figure 1:
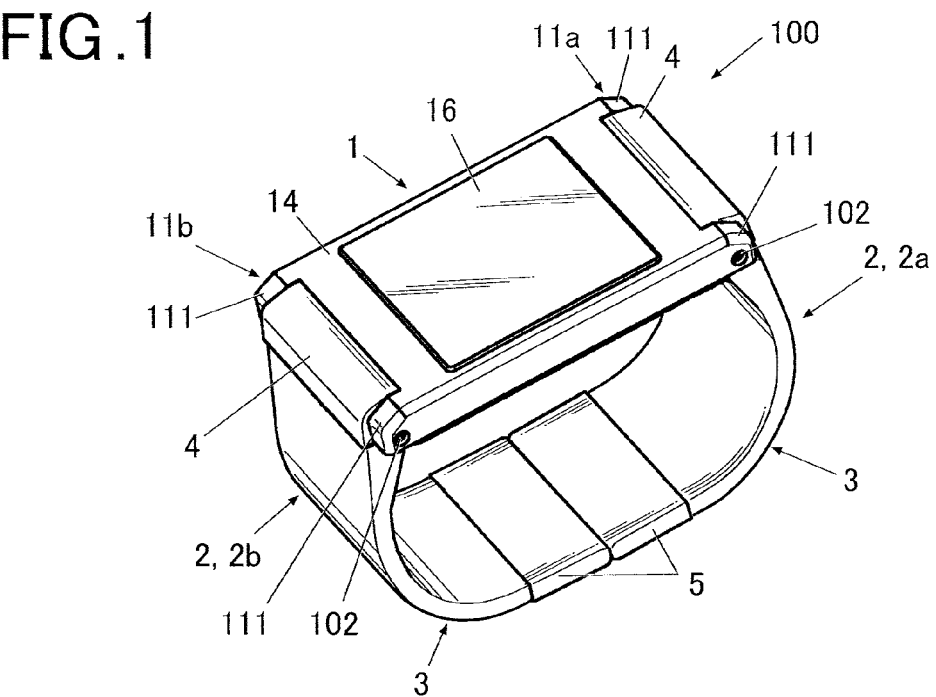
FIG. 1 is a perspective view showing the outer appearance of an electronic equipment in an embodiment.

FIG. 1 is a perspective view showing the outer appearance of the electronic equipment in the embodiment.

As shown in FIG. 1, an electronic equipment 100 includes an equipment body 1 and a pair of bands 2 (that is, bands 2a and 2b) connected to the equipment body 1. Hereinafter, the simple term "bands 2" includes both the bands 2a and 2b.

The electronic equipment 100 is a wristwatch type terminal apparatus (wrist terminal apparatus), for example. As shown in FIG. 1, the electronic equipment 100 can be worn around the arm by connecting the bands 2a and 2b to each other, the bands 2a and 2b being attached to the equipment body 1. The electronic equipment 100 may be anything as long as it includes a band and an equipment body to be connected to the band, and not limited to the wristwatch type terminal apparatus as shown in FIG. 1.

Hereinafter, the equipment body 1 and the bands 2 will be described in detail.

Figure 2:
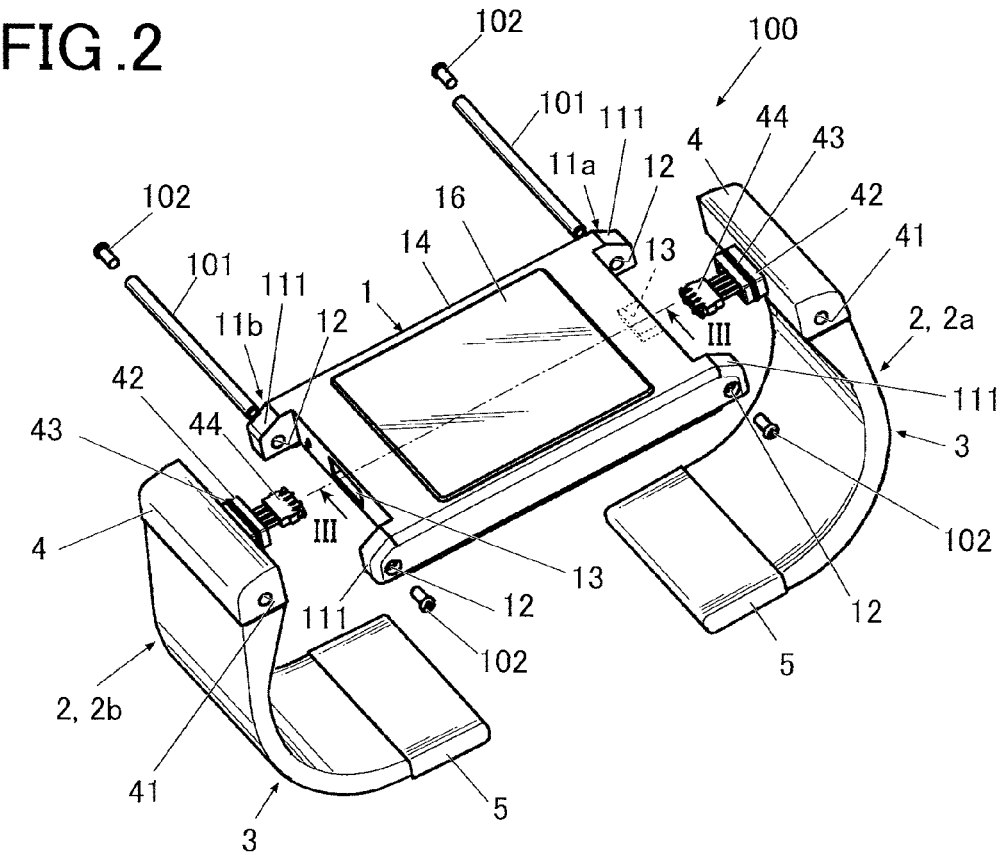
FIG. 2 is an exploded perspective view of the electronic equipment shown in FIG. 1.
Figure 3:
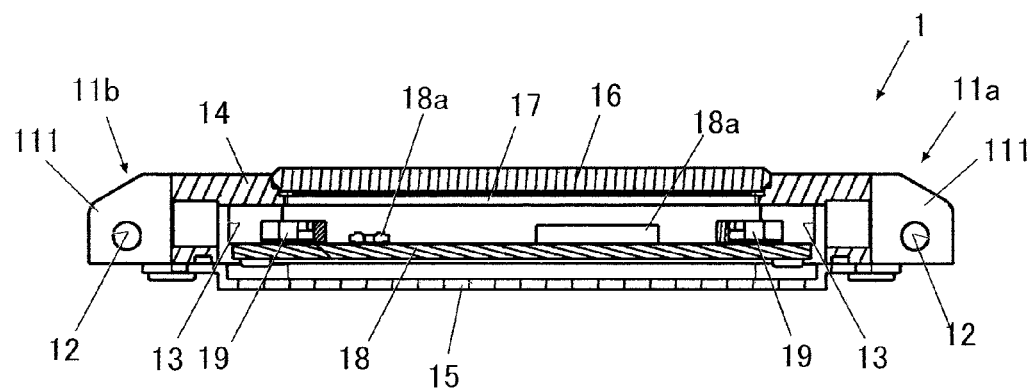
FIG. 3 is a sectional view of the electronic equipment cut along the line III-III of FIG. 2.

FIG. 2 is an exploded perspective view of the electronic equipment shown in FIG. 1. FIG. 3 is a lateral sectional view of the equipment body cut along the line III-III in FIG. 2.

As shown in FIGS. 2 and 3, band attachment sections 11a and 11b for attaching the respective bands 2a and 2b are respectively provided to two sides facing each other in the equipment body 1. Each of the band attachment sections 11a and 11b includes a pair of legs 111, and a shaft inserting hole 12 is provided to each of the legs 111 so as to penetrate the leg 111 in the width direction of band 2 which is to be attached to the equipment body 1.

A battery connector inserting section 13 is formed between each pair of legs 111 in the equipment body 1. The battery connector inserting section 13 is a hole section in which a battery connector 44 (to be described later) of the band 2 is inserted.

As shown in FIGS. 2 and 3, the equipment body 1 includes a body case 14 which has upper and lower (upper and lower in FIG. 3) openings and a back cover member 15 which covers the lower opening of the body case 14 (the opening located on the lower side in FIG. 3 and on the back surface side of the electronic equipment 100).

A cover member 16 is fit in the upper opening (opening located on the upper side in FIG. 3 and on the front surface side of the electronic equipment 100) of the body case 14. The cover member 16 is formed of transparent reinforced glass, for example.

A display panel unit 17 is disposed under (the lower side in FIG. 3 and the back surface side of electronic equipment 100) the cover member 16 inside the equipment body 1.

The display panel unit 17 is a display unit which is configured by including an organic electroluminescence display and a liquid crystal display (LCD), for example. The display panel unit 17 may be an integrally formed touch panel for performing various operations.

A main board 18 is disposed under (the lower side in FIG. 3 and the back surface side of the electronic equipment 100) the display panel unit 17 inside the equipment body 1, the main board 18 being a PCB (printed circuit board) on which various electronic components 18a are loaded.

Figure 4:
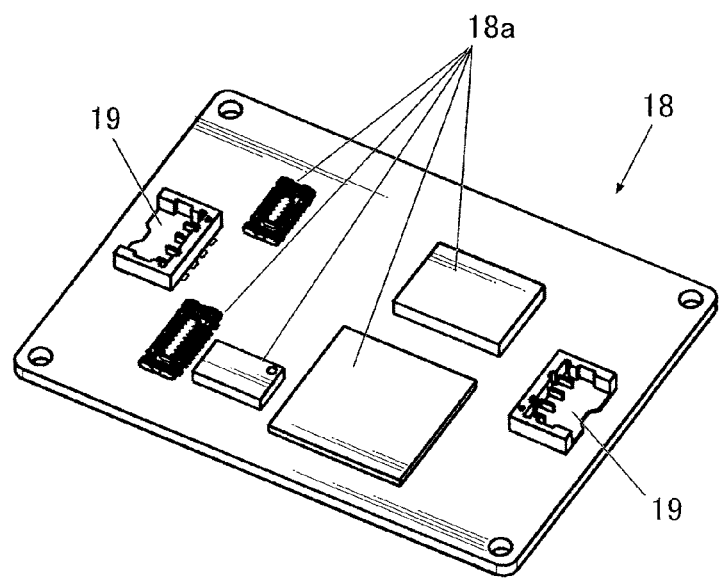
FIG. 4 is a perspective view of a main board in the embodiment.

FIG. 4 is a perspective view of the main board 18 in the embodiment.

As shown in FIG. 4, in the embodiment, board connectors 19 are respectively provided on the main board 18 at the positions corresponding to the battery connector inserting sections 13 in the equipment body 1.

When the battery connectors 44 of the bands 2a and 2b are inserted into the respective battery connector inserting sections 13, the battery connectors 44 are fit in and electrically connected to the board connectors 19.

Figure 5A:
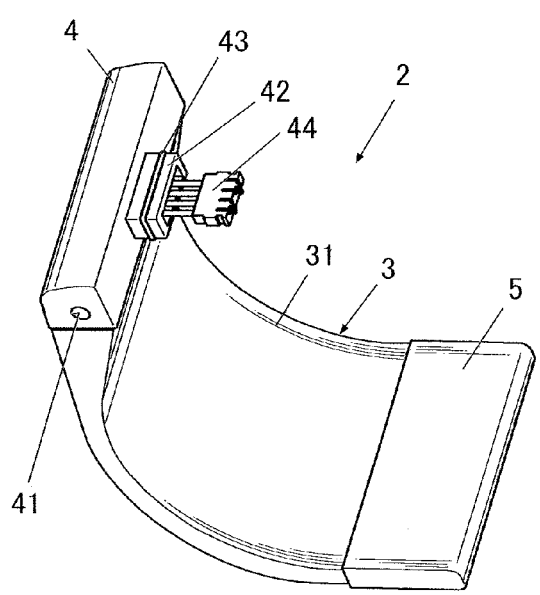
FIG. 5A is a perspective view showing the outer appearance of a band in the embodiment.
Figure 5B:
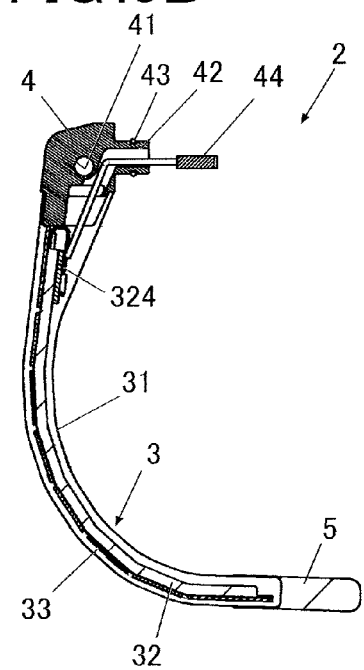
FIG. 5B is a lateral sectional view of the band.

FIG. 5A is a perspective view showing the outer appearance of the band 2 in the embodiment, and FIG. 5B is a lateral sectional view of the band 2.

As shown in FIGS. 5A and 5B, the band 2 includes a band body a connecting section 4 which is disposed at one end of the band body 3 and connected to the equipment body 1, and a locking section 5 which is disposed at the other end of the band body 3 and has a clasp structure not shown in the drawings to connect a pair of bands 2a and 2b to each other.

As shown in FIG. 5A, the entire band body 3 is entirely insert-molded by resin such as elastomer, and the outside of the band body 3 is covered with a resin layer 31.

Figure 5C:
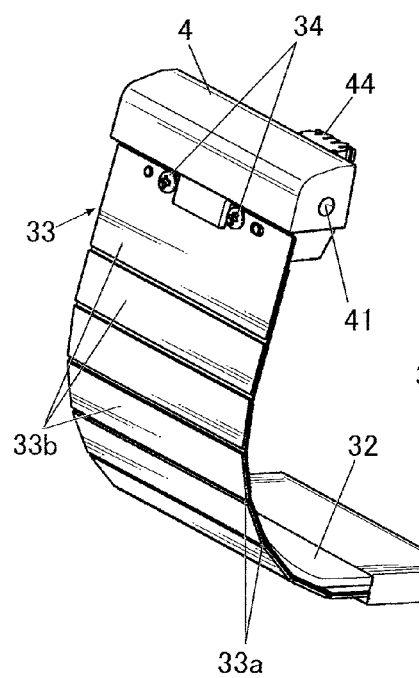
FIG. 5C is a perspective view showing the internal configuration of the band from the front side of the band from which a resin layer is removed.
Figure 5D:
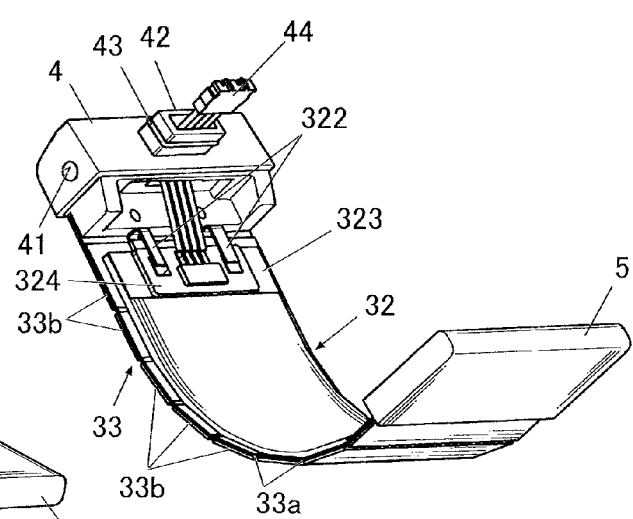
FIG. 5D is a perspective view showing the internal configuration of the band from the back side of the band from which the resin layer is removed.

Each of FIGS. 5C and 5D is a view showing the internal configuration of the band 2 in the embodiment in which the insert-molded resin layer 31 is removed from the band body 3. FIG. 5C is a view of the band 2 seen from the front side (that is, the outside when the band 2 is worn around the arm), and FIG. 5D is a view of the band 2 seen from the back side (that is, the side contacting the arm when the band 2 is worn around the arm).

As shown in FIGS. 5B to 5D, the band body 3 includes a flexible battery 32 as a device and a protective frame 33 for protecting the flexible battery 32 inside the resin layer 31.

The flexible battery 32 is a device having a part to be protected which is relatively vulnerable to deformation. For example, the flexible battery 32 is a laminate pack type lithium-ion battery. The flexible battery 32 may be anything as long as it is capable of bending deformation to some degree, and not limited to the laminate pack type lithium-ion battery.

Figure 6A:
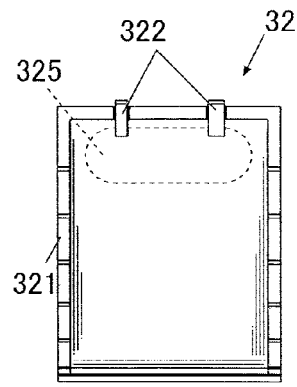
FIG. 6A is a plan view of a flexible battery which can be applied in the embodiment.
Figure 6B:
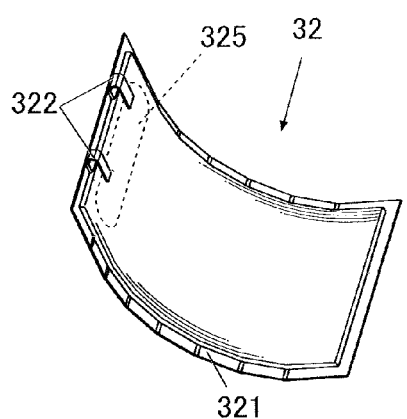
FIG. 6B is a perspective view of the flexible battery.

FIG. 6A is a plan view showing an example of the flexible battery 32 to which the present invention can be applied in the embodiment. FIG. 6B is a perspective view of the flexible battery 32 shown in FIG. 6A, FIG. 6C is a lateral view of the flexible battery 32 shown in FIG. 6A.

Figure 6C:
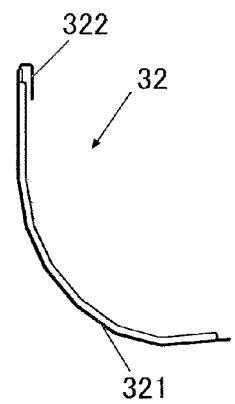
FIG. 6C is a lateral view of the flexible battery.

As shown in FIGS. 6A to 6C, the flexible battery 32 includes, on its outer periphery edge, a sealing section 321 which is a sealing portion of outer packaging film.

At one end of the flexible battery 32, internal electrodes 322, which are formed of a positive electrode and a negative electrode to be connected to external terminals, are exposed.

As shown in FIG. 5D, a protection sheet 323 and a protection circuit board 324 are disposed at a position where the internal electrodes 322 in the flexible battery 32 are provided.

The internal electrodes 322 of the flexible battery 32 are electrically connected to the protection circuit board 324, and the protection circuit board 324 is provided with at least fuse.

The protection circuit board 324 is connected to one end of the wiring connected to the battery connector 44 of an after-mentioned connecting section 4.

As shown in FIGS. 6A and 6B, the surrounding area (area surrounded by the dashed line in FIGS. 6A and 6B) of the portion exposing the internal electrodes 322 in the flexible battery 32 is a bonding section 325 where the internal electrodes 322 are connected to the external terminals on the protection circuit board 324. The bonding section 325 is a part to be protected which is very vulnerable to deformation since the internal electrodes 322 are bonded to the protection circuit board 324 by spot welding. For example, when the bonding section 325 is deformed due to the external force caused by attachment of the equipment body 1, the welded part is broken and the flexible battery 32 is damaged.

Since the flexible battery 32 is a laminate pack type as described above, the flexible battery 32 is not easily damaged when deformation is made in a simple bending direction; however, when a twist deformation is applied, the sealing section 321 formed on the peripheral portion of the flexible battery 32 has a hole, crack or such like, and thus, the flexible battery 32 is deteriorated.

Thus, in the embodiment, as shown in FIGS. 5C and 5D, the bonding section 325 and the flexible battery 32 are disposed on the protective frame 33 so that the external force generated by attachment of the equipment body 1 is not concentrated on the bonding section 325 and the flexible battery 32. Thus, it is possible to prevent the bonding section 325 and the flexible battery 32 from damage.

The protective frame 33 has hard sections which are difficult to deform and are disposed at positions where the part to be protected of the device is to be disposed, and a soft section which is disposed so as to connect the hard sections and easy to deform.

As described later, the protective frame 33 in the embodiment is superimposed on the flexible battery 32 which is a device having the bonding section 325 as a part to be protected, and thus, undesired deformation of the flexible battery 32 is prevented.

The protective frame 33 is fixed to the connecting section 4 via screws 34.

Figure 7A:
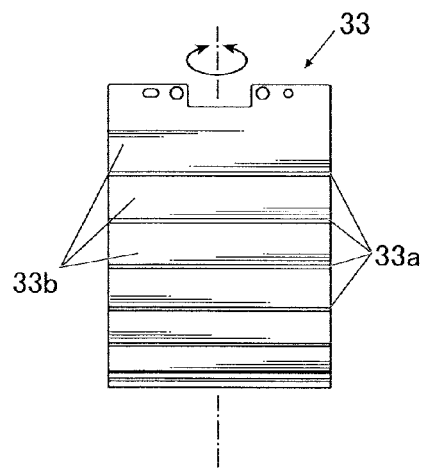
FIG. 7A is a plan view of a protective frame.
Figure 7B:
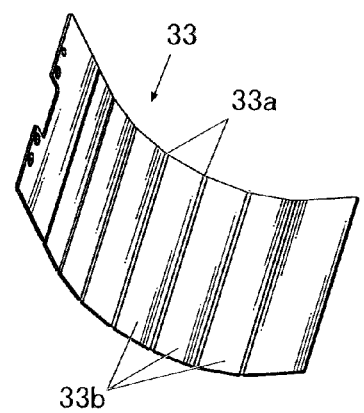
FIG. 7B is a perspective view of the protective frame.
Figure 7C:
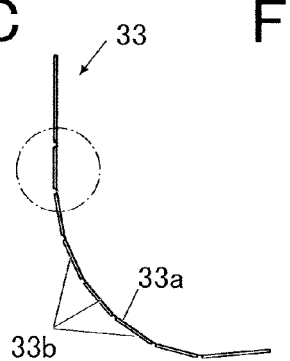
FIG. 7C is a lateral view of the protective frame.
Figure 7D:
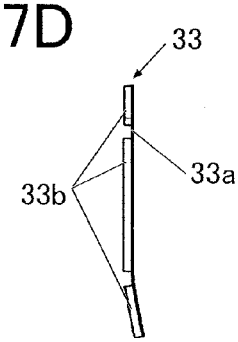
FIG. 7D is an enlarged view of the portion surrounded by the dot-and-dash line in FIG. 7C.

FIG. 7A is a plan view of the protective frame 33, FIG. 7B is a perspective view of the protective frame 33, FIG. 7C is a lateral view of the protective frame 33, and FIG. 7D is an enlarged view of the portion surrounded by the dot-and-dash line in FIG. 7C.

As shown in FIGS. 7A to 7D, for example, the protective frame 33 is formed of a plurality of soft sections 33a each of which is formed of a soft material such as a polyimide film and a plurality of hard sections 33b each of which is a double-layered structure obtained by laminating a hard material such as polycarbonate on the layer of soft section 33a, the hard material being a material harder than the soft material forming the soft sections 33a. Adjacent hard sections 33b are disposed having a distance therebetween via the soft section 33a, and the soft section 33a between the hard sections 33b is easily deformed by the external force compared to the hard sections 33b. Thus, the protective frame 33 itself has flexibility. The hard sections 33b are not limited to the double-layered structure, and the hard sections 33b may be formed of three layers or more including the soft section 33a by including at least one layer of hard material. In this case, there may be two layers or more of hard material layers, or may be two layers or more of layers of soft sections 33a. Furthermore, the hard section 33b may be bonded to the soft section 33a by forming the hard section 33b only with a hard material without using the layer of soft section 33a. The hardness may be appropriately adjusted by adjusting the thickness of the soft material and the hard material.

Here, when the soft material is represented by longitudinal elasticity modulus (Young's modulus) which is an evaluation value of bending rigidity and flexure rigidity, the soft material has a Young's modulus of approximately 1 GPa or less. The hard material has a Young's modulus exceeding 1 GPa.

For example, in addition to the polyimide film, the soft section 33a may be formed by using rubber having the hardness of 60 (Young's modulus of approximately 28 MPa) and polyethylene (Young's modulus of approximately 760 MPa) as a soft material.

In addition to the above hard polycarbonate (Young's modulus of approximately 2.3 GPa), copper (Young's modulus of approximately 130 GPa) may be used as a hard material to form the hard section 33b, for example.

As described above, providing soft sections 33a and hard sections 33b to the protective frame 33 allows bending deformation of the protective frame 33 since the soft sections 33a have flexibility.

On the other hand, the hard sections 33b of the double-layered structure having a layered hard material are hard, and do not have flexibility. Thus, the hard sections 33b are not capable of bending deformation.

In the embodiment, as shown in FIGS. 7A to 7D, the soft sections 33a having flexibility are narrow. Thus, the protective frame 33 as a whole is deformed in a simple bending direction (that is, horizontal direction in FIG. 7C), but hardly deformed in the twisting direction (for example, rotation direction around the shaft of dashed-dotted line of FIG. 7A).

By the connecting sections 4 being attached to the respective band attachment sections 11a and 11b of the equipment body 1, the bands 2a and 2b are physically and electrically connected to the equipment body 1.

As shown in FIG. 2, for example, each of the connecting sections 4 has a through hole 41 penetrating the portion which is to be communicated with shaft inserting holes 12 in the width direction of each of the bands 2a and 2b while the bands 2a and 2b are attached to the equipment body 1.

When connecting the bands 2a and 2b to the equipment body 1, the connecting section 4 of each of the bands 2a and 2b is fit between the pair of legs 111 of the equipment body 1. A shaft member 101 is inserted into the shaft inserting holes 12 and the through hole 41, and fixed by being screwed by screws 102 respectively from the both sides of the shaft member 101.

As shown in FIG. 5A, on the side of connecting section 4 to be attached to the equipment body 1, there is provided a fitting section 42 to be fit in the hollow battery connector inserting section 13 of the equipment body 1.

On the outer circumferential surface of the fitting section 42, an O ring 43 for maintaining waterproof property and dust resistance is provided. When the band 2 is connected to the equipment body 1, the fitting section 42 is fit into the battery connector inserting section 13 in an air tight state.

The battery connector 44 is exposed from the fitting section 42, the battery connector 44 having a wiring one end of which is connected to the protection circuit board 324 of flexible battery 32.

When the fitting section 42 is fit into the battery connector inserting section 13, the battery connector 44 is inserted from the battery connector inserting section 13 into the equipment body 1, and connected to the board connector 19 disposed on the main board 18.

Thereby, the flexible battery 32 is electrically connected to the main board 18 of equipment body 1. Thus, it is possible to supply electric power from the band 2 to the main board 18, and charge the flexible battery 32 by control of the main board 18.

Next, with reference to FIGS. 8A to 10D, the action of the band and electronic equipment including the band in the embodiment will be described.

When forming the bands 2a and 2b in the embodiment, the protective frame 33 is fixed via screws 34 to the connecting section 4 to be connected to the equipment body 1, and the flexible battery 32 as a device is disposed on the back surface side of the protective frame 33 (that is, the side facing the arm when worn around the arm).

The two internal electrodes 322 which are respectively electrically connected to the positive electrode terminal and negative electrode terminal (not shown in the drawings) of flexible battery 32 are electrically connected to the two electrode terminals of the protection circuit board 324. The protection circuit board 324 and the body of the flexible battery 32 are electrically insulated from each other by the protection sheet 323 provided therebetween. One end of the wiring connected to the battery connector 44 of the connecting section 4 is connected to the protection circuit board 324.

A flexible resin layer 31 is provided so as to cover the entire band body 3 by performing insert molding with resin such as elastomer to the flexible battery 32, protective frame 33, internal electrodes 322, protection sheet 323, protection circuit board 324, other wirings and such like.

Each of the bands 2a and 2b is completed by attaching the locking section 5 to the end of the band body 3 where the connecting section 4 is not provided.

The connecting sections 4 of the completed bands 2a and 2b are fit between the legs 111 of the band attachment sections 11a and 11b of the equipment body 1, respectively. The fitting sections 42 and the battery connectors 44 which are exposed from the respective fitting sections 42 are inserted into the battery connector inserting sections 13 of the equipment body 1, and the battery connectors 44 are electrically connected to the respective board connectors 19 disposed on the main board 18 in the equipment body 1. Thus, it is possible to supply electric power from the flexible battery 32 into the equipment body 1 and control the charging of the flexible battery 32 from the equipment body 1.

When the fitting sections 42 are fit into the battery connector inserting sections 13 in such state, the bands 2a and 2b are connected to the equipment body 1 in a state in which waterproof property and such like are assured by O rings 43 provided to the respective fitting sections 42.

Further, each of the shaft members 101 is inserted to the shaft inserting holes 12 of the equipment body 1 and the through hole 41 of each of the connecting sections 4, and the shaft member 101 is fixed by screws 102 from the both sides of the shaft member 101. Then, attachment of the bands 2a and 2b to the equipment body 1 is completed.

Figures 8A, 8B, 8C, 8D:
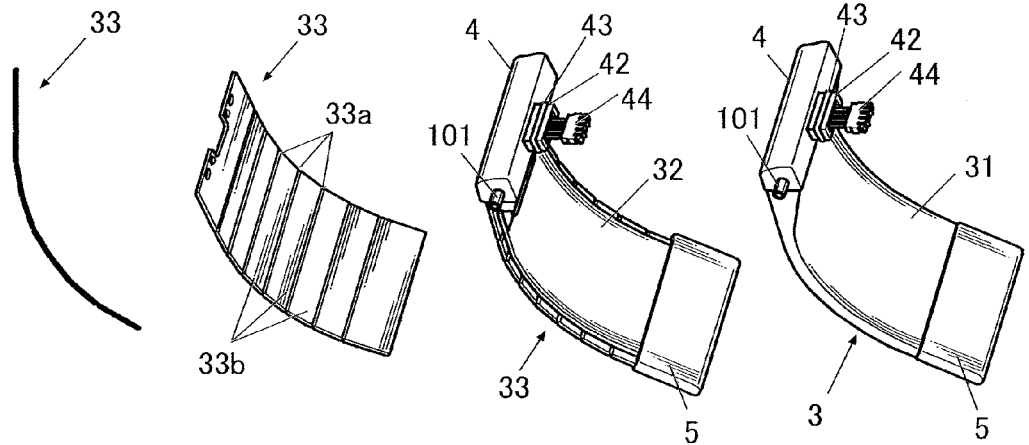
FIG. 8A is a lateral view of the protective frame.
FIG. 8B is a perspective view of the protective frame.
FIG. 8C is a perspective view of a connecting section, the flexible battery, the protective frame and a locking section.
FIG. 8D is a perspective view of the completed band.
Figures 9A, 9B, 9C, 9D:
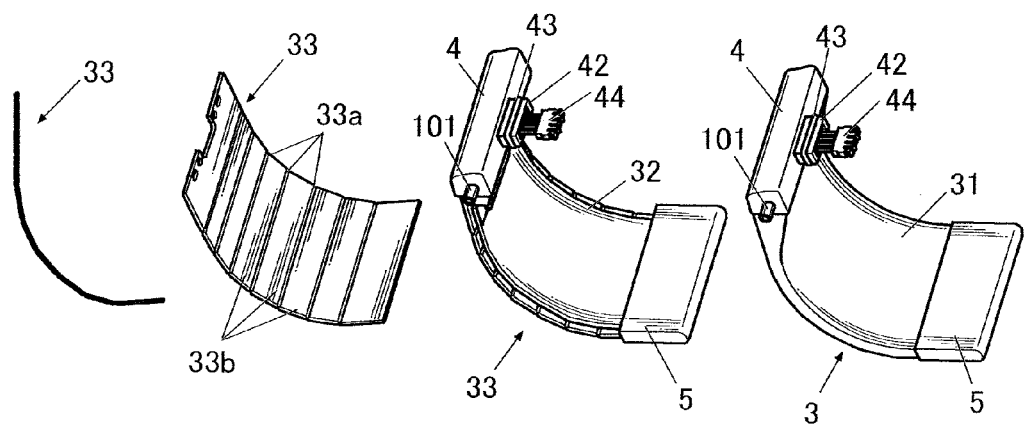
FIG. 9A is a lateral view of the protective frame.
FIG. 9B is a perspective view of the protective frame.
FIG. 9C is a perspective view of the connecting section, flexible battery, protective frame and locking section.
FIG. 9D is a perspective view of the completed band.
Figures 10A, 10B, 10C, 10D:
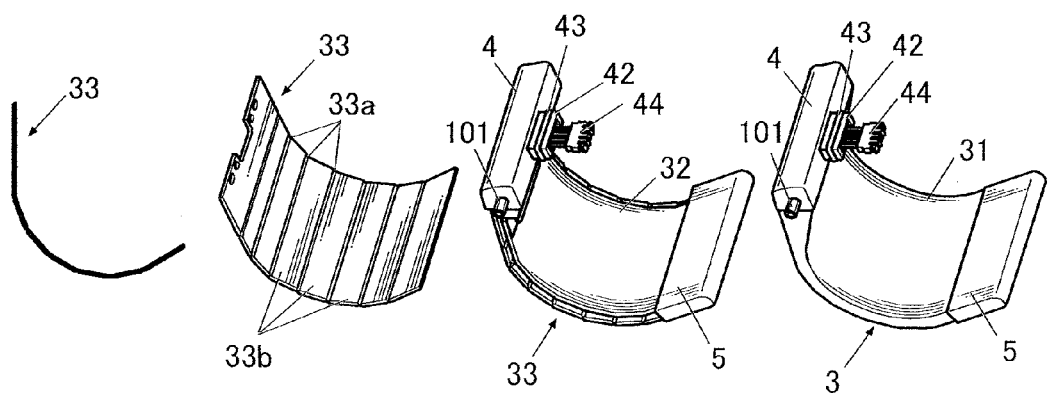
FIG. 10A is a lateral view of the protective frame.
FIG. 10B is a perspective view of the protective frame.
FIG. 10C is a perspective view of the connecting section, flexible battery, protective frame and locking section.
FIG. 10D is a perspective view of the completed band.

FIGS. 8A, 9A and 10A are lateral views of the protective frame 33, FIGS. 8B, 9B and 10B are perspective views of the protective frame 33, FIGS. 8C, 9C and 10C are perspective views of the connecting section 4, flexible battery 32, protective frame 33 and locking section 5, and FIGS. 8D, 9D and 10D are perspective views of the completed band 2.

The bending angle of the band body 3 is increased in the order of FIGS. 8A to 8D, FIGS. 9A to 9D and FIGS. 10A to 10D.

In the embodiment, as shown in FIG. 5D, a hard section 33b of the protective frame 33 is disposed on the back surface of the portion provided with the bonding section 325 as a connecting portion between the internal electrodes 322 of the flexible battery 32 and the outer terminals on the protection circuit board 324. Thus, it is possible to protect the bonding section 325 from being deformed by supporting the bonding section 325 with the hard section 33b, the bonding section being a part to be protected which is vulnerable to deformation.

As for the portion other than the portion corresponding to the bonding section 325, the hard sections 33b are successively disposed at intervals. Since the soft sections 33a are disposed on the intervals between the hard sections 33b, as shown in FIGS. 8D, 9D and 10D, the band body 3 can be comparatively bent flexibly in a case where the band body 3 is bent along the line parallel to the width direction of band 2.

Further, as shown in FIGS. 8A, 9A, 10A, 8B, 9B and 10B, for example, since the interval between the hard sections 33b is comparatively narrow, it is difficult to deform the band in a twisting direction and this avoids the load on the flexible battery 32 which is vulnerable to twisting deformation.

As described above, according to the embodiment, as for the part to be protected which is vulnerable to deformation in the flexible battery 32, the part to be protected is protected from the deformation caused by external force by disposing the hard section 33b in the protective frame 33 on the back surface. Thus, even in a case where the flexible battery 32 is set in the band 2 which is be worn around the arm, it is possible to prevent the flexible battery 32 from being deteriorated and damaged.

The band is difficult to deform in twisting directions since the interval between hard sections 33b is comparatively narrow. Thus, even in a case where the flexible battery 32 having the sealing section 321 formed on the peripheral portion is set in the band 2, it is possible to prevent an excess force caused by the twist deformation from being applied to the flexible battery 32, and it is possible to prevent the flexible battery 32 from deterioration due to the generation of an opening and a crack of the sealing section 321.

Since the soft sections 33a are located at the intervals connecting the hard sections 33b to each other, each of the band bodies 3 can be comparatively bent flexibly along the line parallel to the width direction of band 2. Thus, when the band 2 is worn around the arm, since the band 2 is deformed along the curved shape of the arm, it is possible to achieve a band 2 fitting to the arm well and having good wear comfort.

In such way, as for a part to be protected vulnerable to deformation (for example, bonding section 325 in the embodiment) in a device (flexible battery 32 in the embodiment) which is inserted into the protective frame 33, it is possible to arbitrarily control the position and direction that the band 2 is easily deformed and the amount of deformation by selectively disposing the hard section 33b which is not bent and intentionally changing the size, range, shape and location of the soft sections 33a and the hard sections 33b so as not to generate the deformation in twisting directions.

Thus, it is possible to set various devices in the band 2 without sacrificing the wear comfort of band 2.

In a case where the flexible battery 32 such as lithium ion is set as a device in the band 2 as in the embodiment, a high-capacity power source can be assured, and even when the device which is set in the equipment body 1 has large power consumption, the operation can be sufficiently made.

Since there is no need to set the battery in the equipment body 1, space can be assured in the equipment, and thus, it is possible to achieve a multifunctional equipment in which more electronic equipments and such like are loaded.

Since the flexible battery 32 as a device and the protective frame 33 are disposed inside the resin layer 31 by insert molding, the device and wirings connected thereto do not appear outside. Thus, it is possible to achieve the band 2 with excellent appearance and the electronic equipment 100 including the band 2.

The embodiment to which the present invention can be applied is not limited to the above-mentioned embodiment, and various changes can be made within the scope of the present invention.

For example, the embodiment has been described by taking, as an example, a case where the flexible battery 32 is inserted to the band 2; however, the device to be inserted to the band 2 is not limited to this.

For example, as shown in FIGS. 11A to 11D, a circuit board (expansion board 35) as a device may be inserted to the band 2.

Figure 12A:
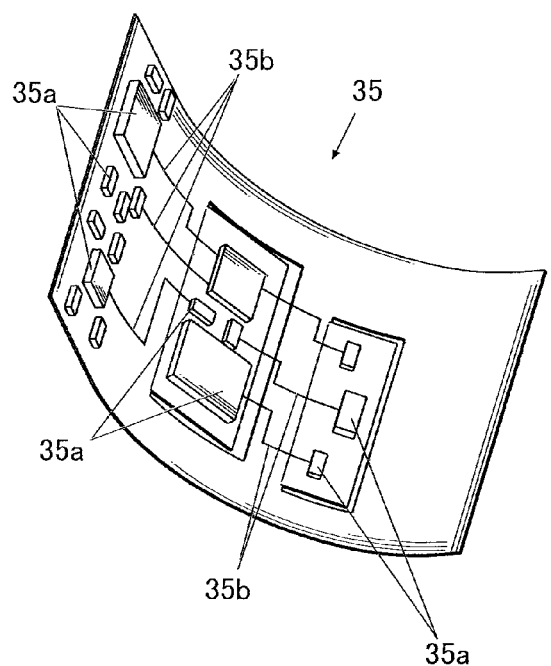
FIG. 12A is a perspective view of an expansion board.
Figure 12B:
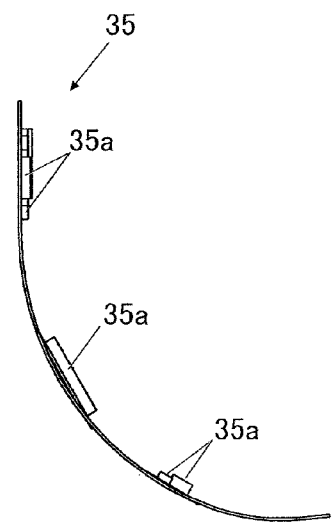
FIG. 12B is a lateral view of the expansion board.

In a case of increasing the function of electronic equipment 100, the main board 18 (see FIG. 3, for example) may be provided in the equipment body 1, and the expansion board 35 as shown in FIGS. 12A and 12B may be inserted into the band 2.

Figure 11A:
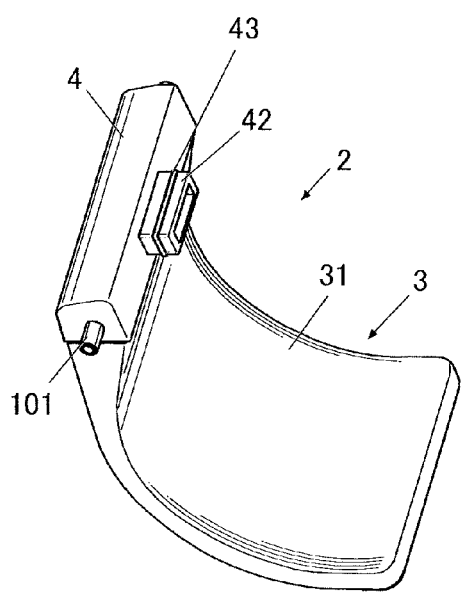
FIG. 11A is a perspective view showing the outer appearance of a band of a modification example.
Figure 11B:
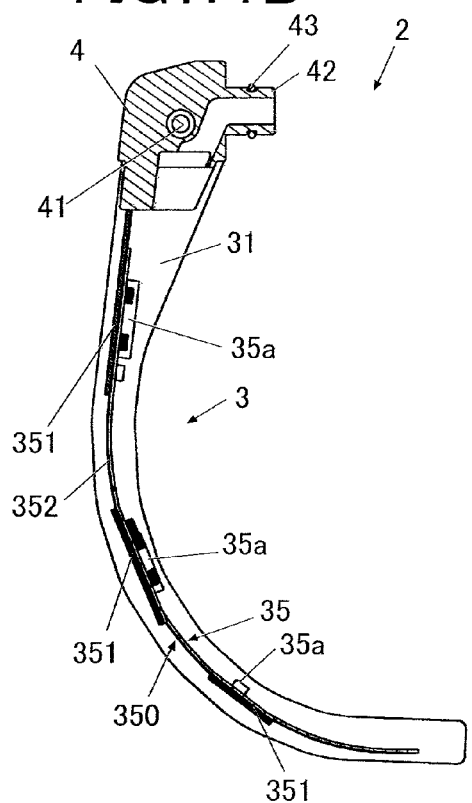
FIG. 11B is a lateral sectional view of the band shown in FIG. 11A.

In this case, as shown in FIGS. 11A and 11B, the expansion board 35 and a protective frame 350 for protecting the expansion board 35 are set in the band body 3 which is entirely covered with the resin layer 31 by the insert molding.

Figure 11C:
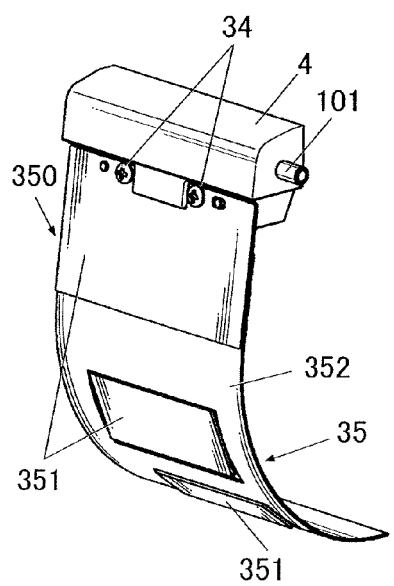
FIG. 11C is a perspective view showing the internal configuration of the band from the front side of the band from which a resin layer is removed.
Figure 11D:
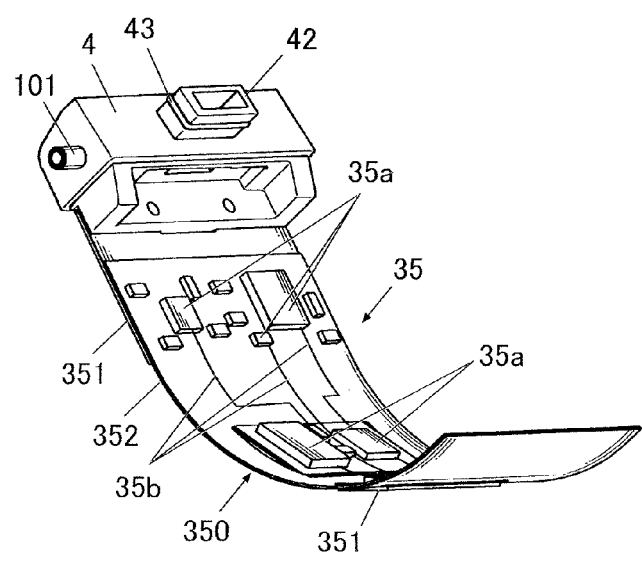
FIG. 11D is a perspective view showing the internal configuration of the band from the back side of the band from which the resin layer is removed.

FIGS. 11C and 11D show the internal configuration of the band 2 shown in FIGS. 11A and 11B from which the resin layer 31 is removed.

Though the locking section 5 is not shown in FIGS. 11A to 11D, the locking section 5 may be provided at one end of the band body 3 similarly to FIGS. 5A to 5D.

FIG. 12A is a perspective view of the expansion board 35, and FIG. 12B is a lateral view of the expansion board 35.

As the expansion board 35 to be inserted into the band 2, a flexible printed circuits (FPC) which can correspond to the bending deformation is applied.

As shown in FIGS. 11D, 12A and 12B, a plurality of electronic components 35a as parts to be protected which are vulnerable to deformation is loaded on the expansion board 35.

The expansion board 35 has regions where the electronic components 35a are loaded and regions where only the wiring 35b is disposed and the electronic components 35 are not loaded.

From among the electronic components 35a, for example, bare chip such as microcomputer has multiple pats on the back surface, and the connection is made by solder ball. In a case of solder ball, since the pat is small and the connection part is small in area, when the expansion board 35 is deformed at the connection part, the solder ball is possibly peeled off from the pat or chip provided on the expansion board 35.

Similarly, since the resistance, capacitor and such like are also solder-connected, it is desired that the expansion board 35 is not deformed also at the connection parts.

Figure 13A:
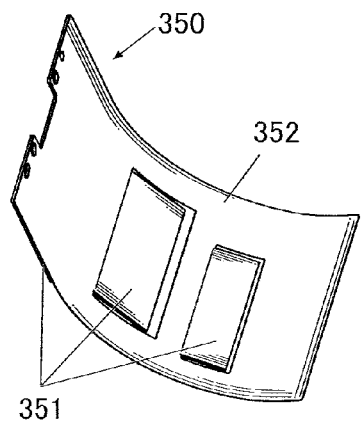
FIG. 13A is a perspective view of the protective frame seen from the surface facing the expansion board.
Figure 13B:
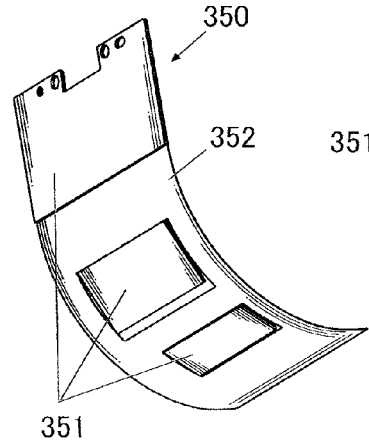
FIG. 13B is a perspective view of the protective frame seen from the surface opposite to the FIG. 13A.
Figure 13C:
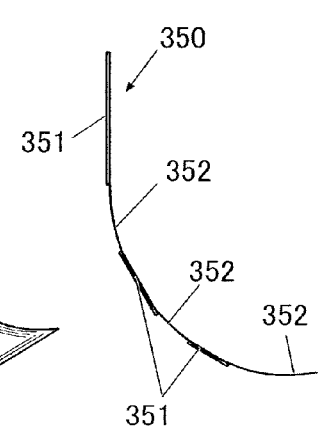
FIG. 13C is a lateral view of the protective frame.

FIG. 13A is a perspective view of the protective frame 350 seen from the surface facing the expansion board 35, FIG. 13B is a perspective view of the protective frame 350 seen from the side opposite to FIG. 13A, and FIG. 13C is a lateral view of the protective frame 350.

As shown in FIGS. 13A to 13C, the portions in the protective frame 350 corresponding to the portions where only the wiring 35b is disposed on the expansion board 35 are soft sections 352 formed of a soft material, and the portions corresponding to the portions where the electronic components 35a as parts to be protected are loaded on the expansion board 35 are hard sections 351 having a hard material.

By disposing such protective frame 350 on the back surface of the expansion board 35, as shown in FIG. 11D, it is possible to achieve a band 2 in which the portions on which electronic components 35a such as bare chip vulnerable to deformation are loaded can be surely protected by the hard sections 351, and the other portions can be flexibly bent, the band 2 being sinuously fit to the arm and having a good wear comfort.

Since the electronic components 35a can be set also inside the band 2 by such configuration, it is possible to achieve an electronic equipment 100 with multiple functions without increasing the size of the equipment body 1. Instead of protective frame 350, as shown in FIG. 7A, there may be a circuit design which uses the protective frame 33 having the soft sections 33a and the hard sections 33b and disposes the electronic components 35a at the hard sections 33b.

The embodiment has been described regarding a case where only one of the flexible battery 32 and the electronic component 35a is provided as a device having a part to be protected; however, the present invention is not limited to this. Both of the flexible battery 32 and the electronic component 35a may be protected by the protective frame including the hard section and soft section.

The embodiment has been described by taking, as an example, a case where the flexible battery 32 having flexibility is insert molded in the band 2; however, the battery which can be insert molded in the band 2 is not limited to the flexible battery 32.

For example, a plurality of can-type batteries 30 may be disposed while the band 2 has flexibility.

Figure 14A:
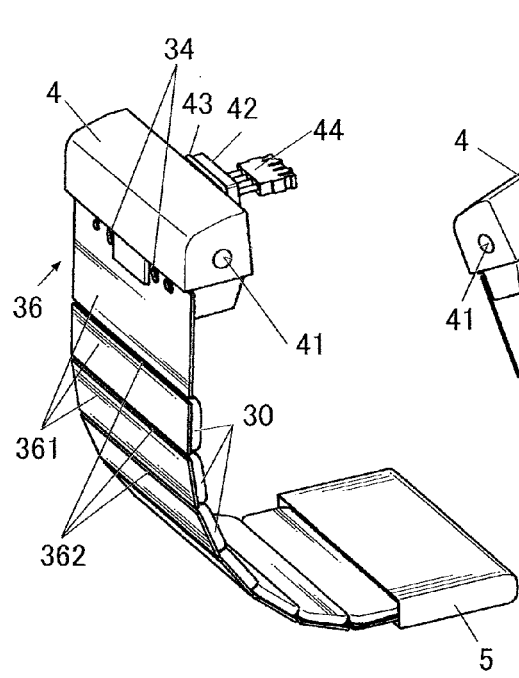
FIG. 14A is a perspective view showing the internal configuration of the band from the front side of the band in a modification example after removing the resin layer from the band.
Figure 14B:
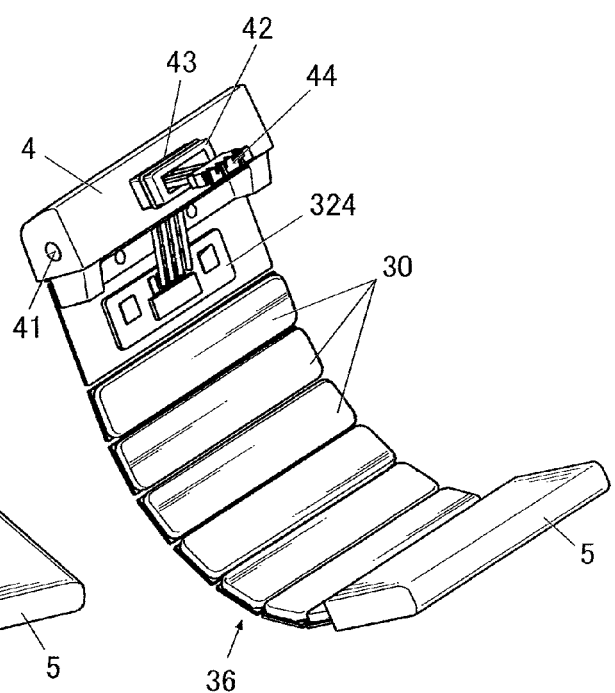
FIG. 14B is a perspective view showing the internal configuration of the band from the back side of the band after removing the resin layer from the band shown in FIG. 14A.
Figure 14C:
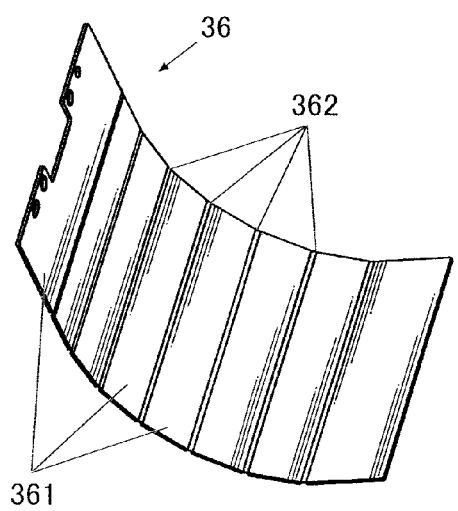
FIG. 14C is a perspective view of the protective frame.

In this case, as shown in FIGS. 14A and 14B, the protective frame 36 supports the plurality of can-type batteries 30 which are electrically connected by a board and a wiring not shown in the drawings.

Also in this case, though the can-type batteries 30, protective frame 36 and such like are covered with resin layer by insert molding, FIGS. 14A and 14B show the internal configuration by removing the resin layer from the band 2 for convenience of illustration.

Figure 14D:
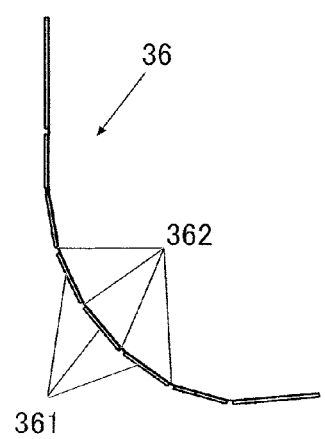
FIG. 14D is a lateral view of the protective frame.
Figure 15A:
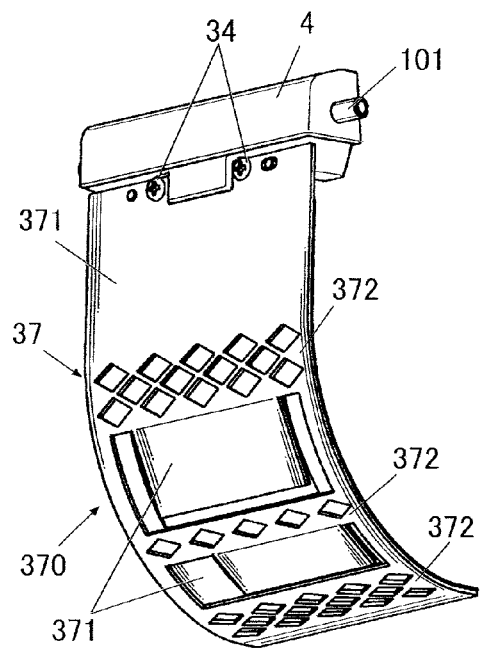
FIG. 15A is a perspective view showing the internal configuration of the band from the front side of the band in a modification example after removing the resin layer from the band.
Figure 15B:
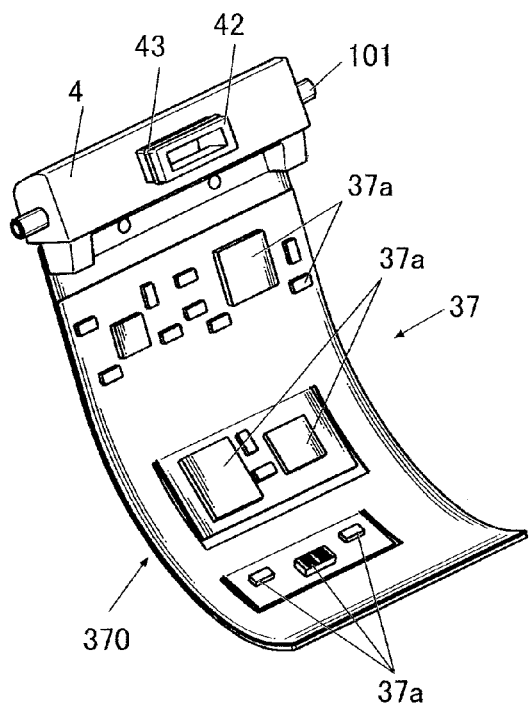
FIG. 15B is a perspective view showing the internal configuration of the band from the back side of the band after removing the resin layer from the band shown in FIG. 15A.
Figure 15C:
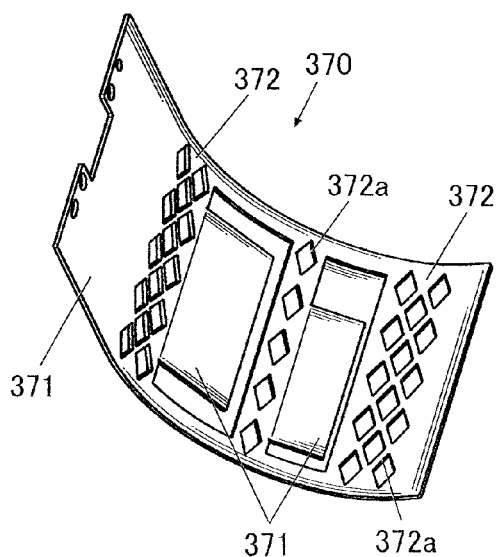
FIG. 15C is a perspective view of the protective frame.
Figure 15D:
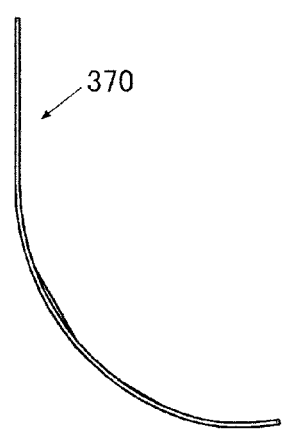
FIG. 15D is a lateral view of the protective frame.

In this case, as shown in FIGS. 14A and 14D, the protective frame 36 is formed of the hard sections 361 having a width corresponding to the can-type battery 30, and the soft sections 362 disposed between hard sections 361.

That is, since there is possibility that the can-type battery 30 is damaged when excess force is applied to the can-type battery 30 which is a part to be protected vulnerable to deformation, the hard sections 361 are disposed at the portions corresponding to the can-type batteries 30 in the protective frame 36. The can-type batteries 30 are supported by the protective frame 36 by disposing the soft sections 362 which can be bent at the portions other than the portions to dispose the can-type batteries 30.

Thus, since the bending force is hardly applied to the portion where the can-type batteries 30 are disposed, it is possible to prevent the break of can-type battery 30 due to the deformation. Since flexible bending is allowed at the portions where the can-type batteries 30 are not provided, it is possible to achieve the band 2 fitting to the arm and having good wear comfort.

The embodiment has been described by showing an example in which materials having different hardness (that is, hard material and soft material) are used to form hard sections and soft sections in one protective frame; however, the method for forming the hard sections and the soft sections are not limited to this.

For example, as shown in FIGS. 15A to 15D, the plate-like protective frame 370 formed of a hard material such as SUS material may be provided with openings 372a formed by etching, or may be provided with soft sections 372 formed by performing stretching to form portions thinner than the hard sections 371. The sections may be disposed on the back surface side of the expansion board 37 so that the hard sections 371 are disposed on the portions where the electronic components 37a are disposed.

In this case, the etched portions are soft sections 372 having softness and the non-etched portions are hard sections 371 maintaining SUS material's natural hardness and rigidity.

Also in this case, the hard sections 371 and the soft sections 372 are arbitrarily set by disposing hard sections 371 at the portions to be protected and disposing the soft sections 372 at the portions to be flexibly bent. Thus, it is possible to satisfy both the protection of electronic components 37a and such like and the wear comfort as the band 2.

By performing drawing process and slapping process to a metal material, it is possible to increase the rigidity of the processed part of the metal material.

Figure 16A:
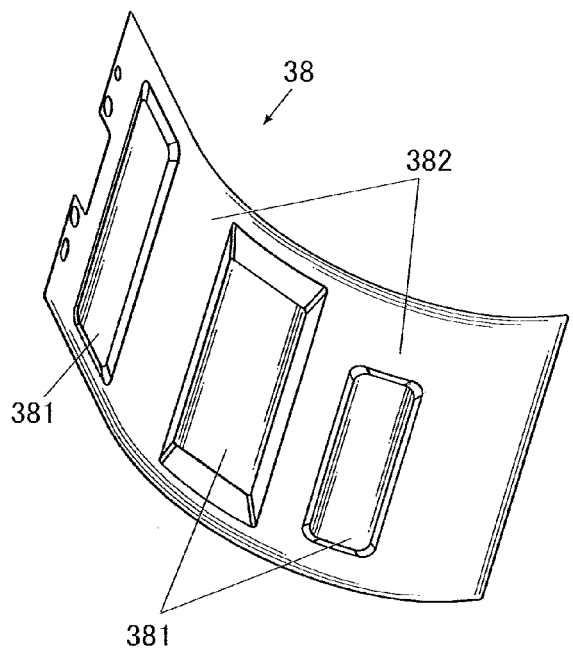
FIG. 16A is a perspective view of the protective frame in a modification example.
Figure 16B:
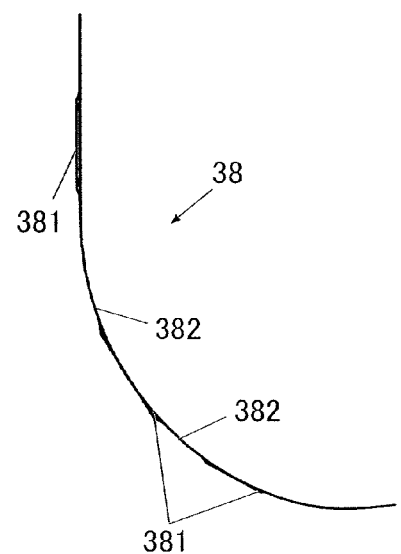
FIG. 16B is a lateral view of the protective frame shown in FIG. 16A.

Thus, as shown in FIGS. 16A and 16B, for example, the drawing process and the slapping process may be partially performed to the protective frame 38 to form the hard sections 381 and make the other portions be soft sections 382 which are easy to make bending deformation.

Also in this case, it is possible to satisfy both the protection of electronic components and such like and the wear comfort as the band 2 by disposing the hard sections 381 at the portions where the electronic components and such like are disposed and disposing the soft sections 382 at the other portions.

Though FIGS. 15A to 15D and FIGS. 16A and 16B illustrate a case of inserting the circuit board loading the electronic components into the band 2. However, it goes without saying that the methods shown in FIG. 15A to FIG. 15D and FIGS. 16A and 16B can be applied to the case of inserting the flexible battery 32, can-type battery 30 and such like into the band 2.

Further, the protective frame may be an aramid frame incorporating aramid fiber into the resin as the material.

Figure 17A:
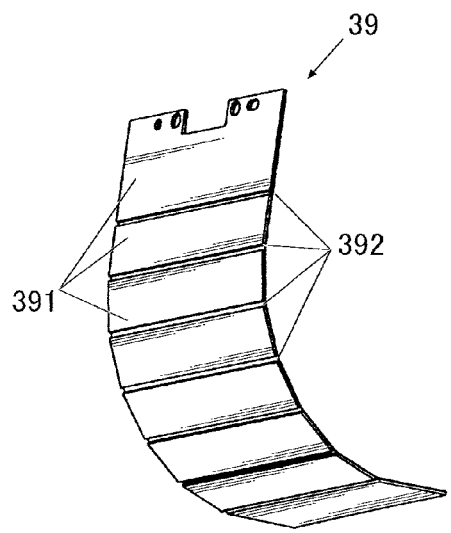
FIG. 17A is a perspective view of the protective frame in a modification example seen from the front side of the band.
Figure 17B:
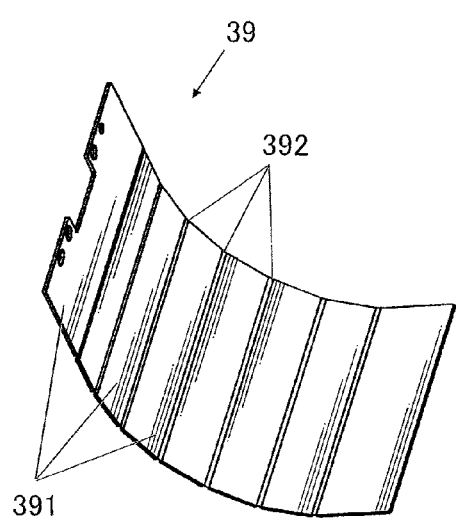
FIG. 17B is a perspective view of the protective frame in the modification example seen from the back side of the band.

In this case, as shown in FIGS. 17A and 17B, the protective frame 39 includes hard sections 391 formed of hard epoxy resin and such like and soft sections 392 formed of soft epoxy resin and such like. Aramid fiber is incorporated into the hard epoxy resin forming the hard sections 391 and soft epoxy resin forming the soft sections 392.

The aramid fiber is excellent in tensile strength, difficult to break, and difficult to damage with respect to a lunge by something sharp such as a knife. Thus, by incorporating aramid fiber into the resin material forming the protective frame 39, it is possible to satisfy both the protection of electronic components and such like and the flexibility and comfort as the band 2, and further to improve the protection property such as resistance to a projection for protecting the device and the human body of a person wearing the band 2.

Further, in a case of incorporating the aramid fiber, since metal material is not used, it is possible to improve the strength of the band 2 without influencing the antenna property when using the band for the electronic equipment incorporating the antenna, for example.

The proportion of aramid fiber mixed in the resin material is appropriately set according to the usage of band 2, and such like. The amount of aramid fiber mixed into the hard sections 391 and the amount of aramid fiber mixed into the soft sections 392 may be the same or different.

The fiber which can be mixed into the protective frame is not limited to the aramid fiber, and other various functional fibers may be appropriately mixed into the resin material forming the protective frame according to the usage in order to achieve a high quality band 2 having various additional values.

In a case where aramid fiber is incorporated into the resin material forming the hard sections 391 and the soft sections 392, a material for ensuring safety may be further mixed into the resin material.

For example, in a case where the protective frame is used as a member for protecting the flexible battery when insert molding the flexible lithium-ion battery into the band 2, by mixing calcium carbonate into the resin material, it is possible to detoxify a harmful material by neutralizing the harmful material even when the harmful material leaks from the flexible lithium-ion battery and such like. Thus, it is possible to achieve the band 2 excellent in safety by preventing the harmful material from attaching to the human body of a person wearing the band 2. It is also possible to prevent the harmful material from leaking outside the resin layer 31 even when the harmful material leaks from the flexible lithium-ion battery and such like by providing a flexible resin layer 31 so as to seal the entire band body 3 tightly by the insert molding of resin such as elastomer.

The material for ensuring safety is not limited to the calcium carbonate and appropriately selected according to the usage.

Though several embodiments of the present invention have been described above, the embodiments are merely examples, and thus do not limit the technical scope of the present invention. The present invention can be applied to other various embodiments, and further, various modifications such as omission and replacement can be made within the scope of the present invention. The scope of the present invention is not limited to the above embodiments and modifications, and includes the scope of inventions, which is described in the scope of claims, and the scope equivalent thereof.

What is claimed is:

1. A band, comprising:
    a flexible battery; and
    a protective frame which has at least one soft section that is easily deformed and a plurality of hard sections that are less easily deformed than the soft section, the plurality of hard sections being connected to the at least one soft section, and the soft section and the plurality of hard sections being disposed at a portion where the flexible battery is disposed.

2. The band according to claim 1, wherein
the protective frame is formed by using a resin material, and
a material for ensuring safety is mixed into the resin material.

3. The band according to claim 1, wherein the soft section has an opening or the soft section is thinner than the hard sections.

4. An electronic equipment, comprising:
a band; and
an equipment body which is connected to the band, wherein the band includes:
  a flexible battery; and
  a protective frame which has at least one soft section that is easily deformed and a plurality of hard sections that are less easily deformed than the soft section, the plurality of hard sections being connected to the at least one soft section, and the soft section and the plurality of hard sections being disposed at a portion where the flexible battery is disposed.

5. The electronic equipment according to claim 4, wherein
the protective frame is formed by using a resin material, and
a material for ensuring safety is mixed into the resin material.

6. The electronic equipment according to claim 4, wherein the soft section has an opening or the soft section is thinner than the hard sections.

7. A band comprising:
a flexible battery; and
a protective frame which has at least one soft section that is easily deformed and a plurality of hard sections that are less easily deformed than the soft section, the plurality of hard sections being connected to the at least one soft section, and the soft section and the plurality of hard sections being disposed at a portion where the flexible battery is disposed,
wherein the soft section has a plurality of openings arranged along a width direction of the band.

* * * * *